UNITED STATES PATENT OFFICE.

EDWARD GOODRICH ACHESON, OF MONONGAHELA CITY, PENNSYLVANIA.

COMPOSITION OF MATTER FOR ABRADING ARTICLES.

SPECIFICATION forming part of Letters Patent No. 572,852, dated December 8, 1896.

Application filed April 17, 1895. Serial No. 546,090. (No specimens.)

*To all whom it may concern:*

Be it known that I, EDWARD GOODRICH ACHESON, of Monongahela City, in the county of Washington and State of Pennsylvania, have invented a new Composition of Matter for Abrading Articles, of which the following is a full, clear, and exact description.

My invention relates to a new composition of matter for the manufacture of grinding-wheels, hones, &c., of silicide of carbon, (carborundum.)

I have discovered that the ordinary processes employed in compounding grinding-wheels, &c., from corundum and emery, namely, mixing the emery or corundum with clay containing alkaline matter, will not make an efficient article of carborundum. I have discovered also that the cause of this is that the alkaline constituents of the bond decompose and spoil the carborundum, and that if the carborundum be mixed with a clay substantially free from alkali, together with a flux, such as feldspar, then subjected to strong pressure and burned until the bonding material is fused, a strong durable article may be produced.

The mixture which I prefer to use is as follows, though the proportions may be varied within wide limits: I take of feldspar eighteen parts by weight; non-alkaline clay, such as a good variety of kaolin or china-clay, six parts by weight, and silicide of carbon, (carborundum,) seventy-six parts by weight. These ingredients are intimately mixed together with a little water and are then placed in a mold of the shape required to be given to the article and are submitted to powerful pressure, preferably that of a hydraulic press. The compressed articles then, having been dried, are fired in a kiln, so as to fuse the bond.

The product is a strong, durable, and efficient article.

I claim—

1. A new composition of matter composed of silicide of carbon bonded with a bond containing a flux and clay substantially free from alkali; substantially as described.

2. A new composition of matter composed of silicide of carbon bonded with clay substantially free from alkali, and feldspar; substantially as described.

In testimony whereof I have hereunto set my hand.

EDWARD GOODRICH ACHESON.

Witnesses:
W. B. CORWIN,
H. M. CORWIN.